(12) United States Patent
Zhang et al.

(10) Patent No.: US 12,217,475 B1
(45) Date of Patent: Feb. 4, 2025

(54) STREAM PROCESSING-BASED NON-BLOCKING ORB FEATURE EXTRACTION ACCELERATOR IMPLEMENTED BY FPGA

(71) Applicant: SHANGHAITECH UNIVERSITY, Shanghai (CN)

(72) Inventors: Qixing Zhang, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 18/813,094

(22) Filed: Aug. 23, 2024

Related U.S. Application Data

(63) Continuation of application No. PCT/CN2024/085261, filed on Apr. 1, 2024.

(30) Foreign Application Priority Data

Nov. 6, 2023 (CN) .......................... 202311468288.0

(51) Int. Cl.
*G06V 10/46* (2022.01)
*G06T 1/60* (2006.01)

(52) U.S. Cl.
CPC .............. *G06V 10/462* (2022.01); *G06T 1/60* (2013.01)

(58) Field of Classification Search
CPC ...... G06V 10/462; G06V 10/464; G06T 1/60; G06T 2207/20164
See application file for complete search history.

(56) References Cited

U.S. PATENT DOCUMENTS

2023/0022398 A1    1/2023   King et al.

FOREIGN PATENT DOCUMENTS

CN    113536024 A    10/2021
CN    114283065 A    4/2022
(Continued)

OTHER PUBLICATIONS

Vemulapati, Vibhakar, and Deming Chen. "Fslam: an efficient and accurate slam accelerator on soc fpgas." 2022 International Conference on Field-Programmable Technology (ICFPT). IEEE, 2022. (Year: 2022).*

(Continued)

*Primary Examiner* — Geoffrey E Summers
(74) *Attorney, Agent, or Firm* — Bayramoglu Law Offices LLC

(57) ABSTRACT

The provided is a stream processing-based non-blocking oriented FAST and rotated BRIEF (ORB) feature extraction accelerator implemented by a field programmable gate array (FPGA), which mainly includes two innovations: A stream processing-based non-blocking hardware architecture and a cache management algorithm are provided. The accelerator precisely controls and buffers each column of an rBRIEF descriptor computation window by using an algorithm, allowing to receive a new input pixel stream while computing a descriptor, thereby achieving non-blocking processing. An efficient hardware sorting design embedded in an accelerator is provided. Based on a count sorting algorithm, minimal resources are used to implement rBRIEF sorting on hardware, and the rBRIEF sorting is embedded in the accelerator. The accelerator ensures quality of a feature point while achieving high-speed feature point extraction, without significantly reducing accuracy of ORB_SLAM and other algorithms.

3 Claims, 5 Drawing Sheets

(56) References Cited

FOREIGN PATENT DOCUMENTS

| CN | 114694063 A | 7/2022 |
|---|---|---|
| CN | 117726921 A | 3/2024 |

OTHER PUBLICATIONS

Xie, Zizhao, et al. "A real-time FPGA-based architecture of improved ORB." MIPPR 2019: Parallel Processing of Images and Optimization Techniques; and Medical Imaging. vol. 11431. SPIE, 2020. (Year: 2020).*

Kulkarni, A. V., J. S. Jagtap, and V. K. Harpale. "Object recognition with ORB and its Implementation on FPGA." International Journal of Advanced Computer Research 3.3 (2013): 164. (Year: 2013).*

Taranco, Raúl, José-Maria Arnau, and Antonio González. "A low-power hardware accelerator for ORB feature extraction in self-driving cars." 2021 IEEE 33rd International Symposium on Computer Architecture and High Performance Computing (SBAC-PAD). IEEE, 2021. (Year: 2021).*

Weberruss, Josh, et al. "FPGA acceleration of multilevel ORB feature extraction for computer vision." 2017 27th International Conference on Field Programmable Logic and Applications (FPL). IEEE, 2017. (Year: 2017).*

Ethan Rublee, et al., ORB: an efficient alternative to SIFT or SURF, IEEE International Conference on Computer Vision, 2011, pp. 2564-2571.

Runze Liu, et al., eSLAM: An Energy-Efficient Accelerator for Real-Time ORB-SLAM on FPGA Platform, DAC, 2019, pp. 1-6, Article No. 193.

Vibhakar Vemulapati, et al., FSLAM: an Efficient and Accurate SLAM Accelerator on SoC FPGAs, International Conference on Field-Programmable Technology (ICFPT), 2022.

Cheng Wang, et al., ac2SLAM: FPGA Accelerated High-Accuracy SLAM with Heapsort and Parallel Keypoint Extractor, International Conference on Field-Programmable Technology (ICFPT), 2021.

Michael Calonder, et al., BRIEF: Binary Robust Independent Elementary Features, ECCV, 2010, pp. 778-792.

\* cited by examiner

| Methods | Latency | Avg. ATE | Resource Utilization | | | | Power |
|---|---|---|---|---|---|---|---|
| | | | LUT | FF | BRAM | DSP | |
| ORB-SLAM3 [7] | 88.5 ms | 3.0 cm | N/A | N/A | N/A | N/A | 1.3 W |
| eSLAM [3] | 9.1 ms | 5.7 cm | 56954 | 67809 | 78 | 111 | 1.9 W |
| $ac^2$SLAM [5] | 2.0 ms | 4.2 cm | 146572 | 74166 | 61 | 173 | N/A |
| FSLAM [4] | 2.5 ms | 3.5 cm | 76424 | 101694 | 120 | 80 | 4.6 W |
| NORB | 1.4 ms | 3.4 cm | 37433 | 52450 | 72 | 33 | 1.5 W |

FIG. 4

STREAM PROCESSING-BASED NON-BLOCKING ORB FEATURE EXTRACTION ACCELERATOR IMPLEMENTED BY FPGA

CROSS-REFERENCE TO THE RELATED APPLICATIONS

This application is a continuation application of International Application No. PCT/CN2024/085261, filed on Apr. 1, 2024, which is based upon and claims priority to Chinese Patent Application No. 202311468288.0, filed on Nov. 6, 2023, the entire contents of which are incorporated herein by reference.

TECHNICAL FIELD

The present disclosure relates to a low-power oriented FAST and rotated BRIEF (ORB) feature extraction accelerator based on a field programmable gate array (FPGA).

BACKGROUND

As a commonly used algorithm in computer vision, the ORB feature extraction algorithm [1] is mainly used to extract invariant pixels (feature points) from continuous images and compute descriptors of the feature points (for matching the feature points). Subsequently, each simultaneous localization and mapping (SLAM) algorithm (such as ORB_SLAM) can be applied to estimate the motion trajectory of a camera by extracting and comparing features of two consecutive frames of images. In addition, a point cloud map composed of feature points can be obtained. This algorithm is widely used in the fields of visual localization and three-dimensional (3D) reconstruction.

At present, with continuous improvement of the resolution and frame rate of cameras, the speed of ORB feature extraction is greatly challenged, especially when the ORB feature extraction runs on a low-power platform such as a small robot or drone. Taking ARM Cortex-A53 as an example, the speed of running the ORB_SLAM is only six frames per second, which is far from the frame rate of the camera. The ORB feature extraction accounts for more than 60% of processing time per frame. Operational efficiency of the ORB_SLAM and other algorithms can be significantly improved by accelerating the ORB feature extraction.

To address this issue, scholars have proposed a series of hardware designs to accelerate an operation of the ORB feature extraction. One of difficulties in hardware design for the ORB feature extraction is that computation of a rotated binary robust independent elementary feature (rBRIEF) descriptor [5] is complex and cannot be parallelized. The eSLAM [2] proposes an RS-BRIEF descriptor, which can significantly reduce computational complexity but significantly decreases accuracy. The FSLAM [3] adopts quantization, table lookup, and other methods to accelerate computation of the angle of a feature point, but is limited in improving the overall rBRIEF computation speed. In addition, due to the difficulty in applying pipeline processing to the computation of the rBRIEF descriptor, the input pixel stream is blocked until a descriptor is fully computed. The designs in the references [2], [3], and [4] are all based on blocking computation, with the latency caused by blocking accounting for 30% of the total latency. In addition, the output descriptor needs to be sorted based on its response value. Due to a large number of descriptors and a large data bit width of each descriptor, typical hardware sorting consumes a lot of on-chip memory and logic resources. The eSLAM [3] adopts heap sorting for the hardware, while the ac2SLAM [4] adds a ping-pong buffer on a basis of the heap sorting to reduce resource occupation.

CITED REFERENCES

[1] E. Rublee, V. Rabaud, K. Konolige, and G. Bradski, "Orb: An efficient alternative to sift or surf," in 2011 International Conference on Computer Vision, 2011, pp. 2564-2571.
[2] R. Liu, J. Yang, Y. Chen, and W. Zhao, "eslam: An energy-efficient accelerator for real-time orb-slam on fpga platform," in Proceedings of the 56th Annual Design Automation Conference 2019, 2019, pp. 1-6.
[3] V. Vemulapati and D. Chen, "Fslam: an efficient and accurate slam accelerator on soc fpgas," in 2022 International Conference on Field-Programmable Technology (ICFPT), 2022, pp. 1-9.
[4] C. Wang, Y. Liu, K. Zuo, J. Tong, Y. Ding, and P. Ren, "ac 2 slam: Fpga accelerated high-accuracy slam with heapsort and parallel keypoint extractor," in 2021 International Conference on Field-Programmable Technology (ICFPT), 2021, pp. 1-9.
[5] M. Calonder, V. Lepetit, C. Strecha, and P. Fua, "Brief: Binary robust independent elementary features," in Proc. 11th European Conference on Computer Vision, 2010, pp. 778-792.

SUMMARY

An objective of the present disclosure is to accelerate ORB feature extraction to significantly improve operational efficiency of ORB_SLAM and other algorithms.

To achieve the above objective, the technical solutions of the present disclosure provide a stream processing-based non-blocking ORB feature extraction accelerator implemented by an FPGA, including:
a downsampling module configured to adjust an input image to a required size to obtain an original image;
a Gaussian filtering module configured to blur the original image to obtain a blurred image;
a corner detection module configured to determine a position of a feature point in the blurred image and output a mask of the feature point;
a non-maximum suppression (NMS) module configured to perform NMS on the mask of the feature point, wherein the stream processing-based non-blocking ORB feature extraction accelerator further includes:
an rBRIEF computation module configured to perform window column selection, rBRIEF computation, and window column First-In First-Out (FIFO) in parallel by using a cache management algorithm, where
a working region of a computation module of an rBRIEF descriptor is a 37×37 sliding window, and the sliding window is updated in each clock cycle; whenever the sliding window is updated, an intermediate pixel of a leftmost column of pixels, namely left pixel, and an intermediate pixel of a rightmost column of pixels, namely right pixel, in the mask of the feature point are detected; if the right pixel is a feature point, an intermediate column of the blurred image is considered as a first column of a window, the intermediate column of the blurred image is written into a window column FIFO queue, a counter is reset, and next 36 intermediate columns are also written into the window column FIFO queue; and if the left pixel is a feature point, the intermediate column of the blurred image is considered as a last column of a window, a label is attached when each intermediate column is written into the window column FIFO queue, to indicate whether the intermediate column is a start column or an end column, and the rBRIEF computation module determines whether to perform the rBRIEF computation based on the label; and the rBRIEF computation module reads data from the window column FIFO queue and concatenates the read data into another window matrix; a new column is inserted at an end of the window matrix in each clock cycle, and other columns of the window matrix are sequentially shifted leftwards; window concatenation operates at a throughput of one column per cycle until a certain column is an end column; subsequently, the reading of the window column FIFO queue is stopped, and the rBRIEF computation is performed; and when the rBRIEF computation is performed, the original image is used to compute a direction of a centroid, and then a BRIEF coordinate is rotated based on an angle of the direction to compute the rBRIEF descriptor; and a sorting module configured to perform hardware implemented count sorting.

Preferably, the sorting module uses 256 containers internally to cache an index of the feature point, and indexes corresponding to feature points with a same response value are cached in a same container.

Preferably, the sorting module is integrated with the rBRIEF computation module; after an rBRIEF descriptor is computed, an index of the rBRIEF descriptor is immediately stored in a container; and after all rBRIEF descriptors are computed, indexes of the rBRIEF descriptors are sequentially outputted in order.

The above technical solutions mainly include the following two innovations:

1) A stream processing-based non-blocking hardware architecture and a cache management algorithm are proposed. This technology precisely controls and buffers each column of an rBRIEF descriptor computation window by using an algorithm, allowing to receive a new input pixel stream while computing a descriptor, thereby achieving non-blocking processing.
2) An efficient hardware sorting design embedded in an accelerator is proposed. Based on a count sorting algorithm, this technology uses minimal resources to implement rBRIEF sorting on hardware and embeds the rBRIEF sorting in the accelerator.

The technical solutions disclosed in the present disclosure are mainly applied to visual SLAM on a low-power platform, achieving high-speed low-power ORB feature extraction through a unique architecture. The non-blocking rBRIEF descriptor computation in the present disclosure significantly improves a data throughput, and the integrated hardware sorting module further reduces an overall latency and resource occupation. The present disclosure ensures quality of a feature point while achieving high-speed feature point extraction, without significantly reducing accuracy of ORB_SLAM and other algorithms.

BRIEF DESCRIPTION OF THE DRAWINGS

FIG. 4 illustrates comparison of experimental data.

DETAILED DESCRIPTION OF THE EMBODIMENTS

The present disclosure will be described in detail below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

Figure 1:
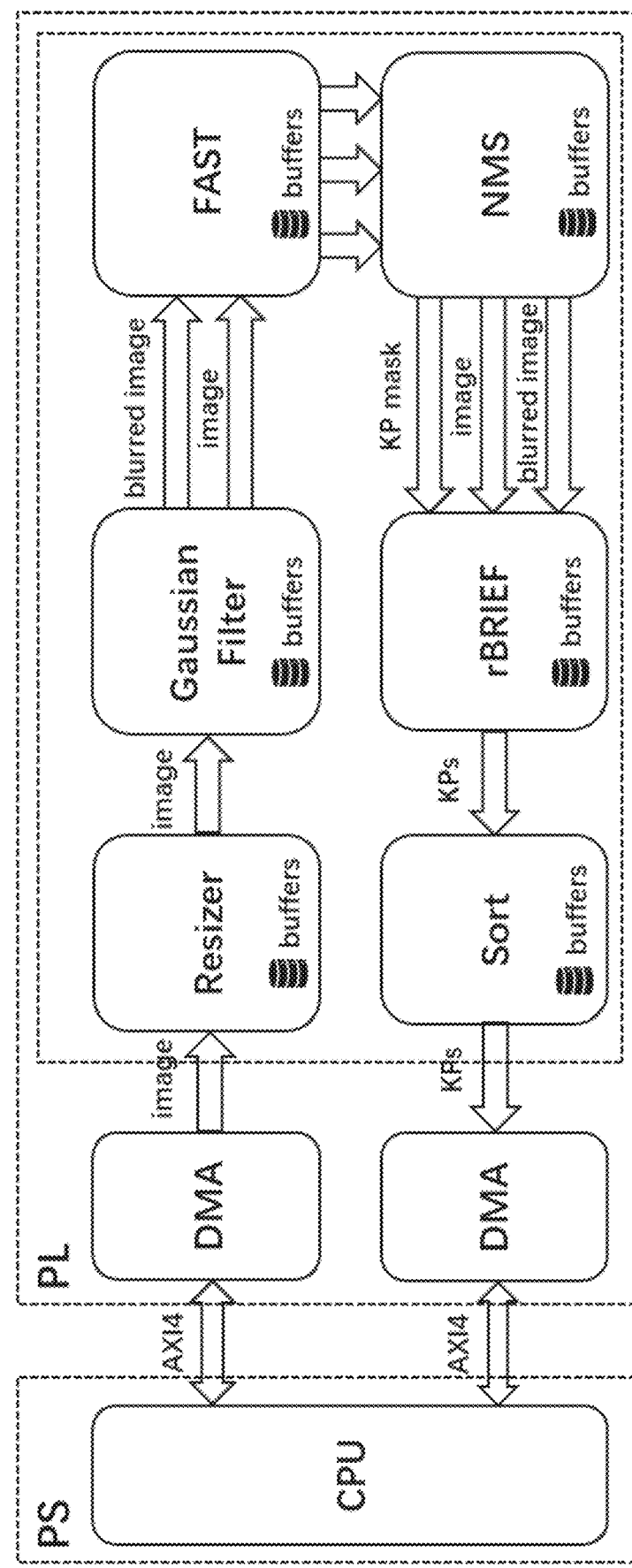
FIG. 1 illustrates a system architecture of an accelerator.

An accelerator provided in the present disclosure fully operates on an FPGA. A system framework of the entire accelerator is shown in FIG. 1. A specific working process of the accelerator is as follows:

An ARM processor (PS part in FIG. 1) inputs image data into the FPGA (PL part in FIG. 1) in a form of a pixel stream through an AXI DMA. The FPGA accelerator includes a downsampling module, a Gaussian filtering module, a corner detection (FAST) module, an NMS module, a descriptor computation (rBRIEF) module, and a sorting (sort) module.

The downsampling module (resizer) adjusts an input image to a required size through linear interpolation.

A resized image is input into the Gaussian Filtering module (Gaussian filter). A fixed Gaussian convolution kernel is used to blur the image.

A blurred image and the original image are synchronously input into the corner detection module (FAST). The corner detection module uses a FAST algorithm to determine a position of a feature point in the blurred image. A mask (KP mask) of the feature point, the blurred image, and the original image are synchronously output. A data value on the mask of the feature point is a Harris response value of the point The NMS module performs 3×3 NMS on the mask of the feature point, and synchronously outputs the blurred image, the original image, and a mask of the feature point after the NMS.

Figure 2:
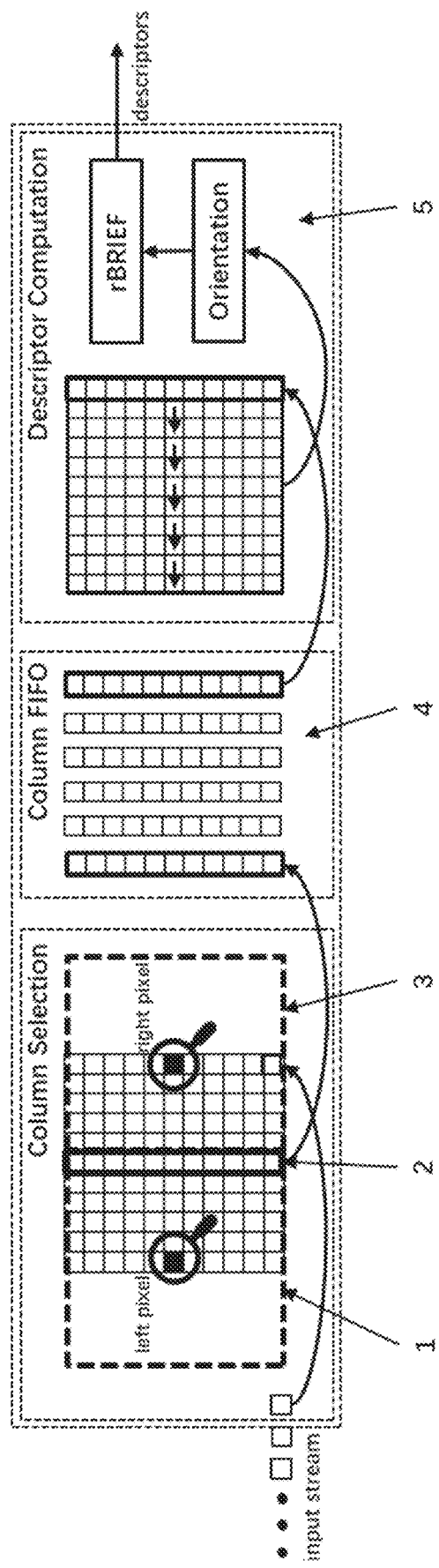
FIG. 2 illustrates a hardware architecture of rBRIEF descriptor computation.

Computation of an rBRIEF descriptor (rBRIEF in FIG. 1) is divided into three parts: window selection, rBRIEF computation, and window column FIFO. The present disclosure provides a new cache management algorithm to perform the three parts in parallel. The entire algorithm structure is shown in FIG. 2, and the following describes a process of the algorithm:

1) Window Column Selection

A working region of a computation module of the rBRIEF descriptor is a 37×37 sliding window, and the sliding window is updated in each clock cycle. Whenever the sliding window is updated, an intermediate pixel of a leftmost column of pixels and an intermediate pixel of a rightmost column of pixels in the mask of the feature point (a left pixel and a right pixel in FIG. 2) are detected. Then, whether to write an intermediate column in the blurred image into a FIFO queue is determined. If the right pixel is a feature point, an intermediate column of the blurred image can be considered as a first column of a window (from left to right), which is represented by dashed box 3 in FIG. 2. The intermediate column is written into the window column FIFO queue, a counter is reset, and next 36 intermediate columns are also written into the window column FIFO queue. If the left pixel is a feature point, the intermediate column can be considered as a last column of a window (which is represented by dashed box 1 in FIG. 2). A label is attached when each intermediate column is written into the window column FIFO queue, to indicate whether the intermediate column is a start column (first column) or an end column (last column), and the rBRIEF computation module determines whether to perform the rBRIEF computation based on the label.

b) rBRIEF Computation

As shown in region 5 in FIG. 2, the rBRIEF computation module reads data from the window column FIFO queue and concatenates the read data into another window matrix. A new column is inserted at an end of the window matrix in each clock cycle, and other columns of the window matrix are sequentially shifted leftwards. Window concatenation operates at a throughput of one column per cycle until a certain column is an end column. Subsequently, the reading of the window column FIFO queue is stopped, and then it takes about 300 cycles to perform the rBRIEF computation. When the rBRIEF computation is performed, the original image is used to compute a direction of a centroid, and then a BRIEF coordinate is rotated based on an angle of the direction to compute the rBRIEF descriptor. c) Window column FIFO The presence of window column buffering (region 4 in FIG. 2) allows different production and consumption rates of window columns. A depth of the window column FIFO is controlled, such that the rBRIEF computation can be achieved without interrupting input of a new pixel.

Figure 3:
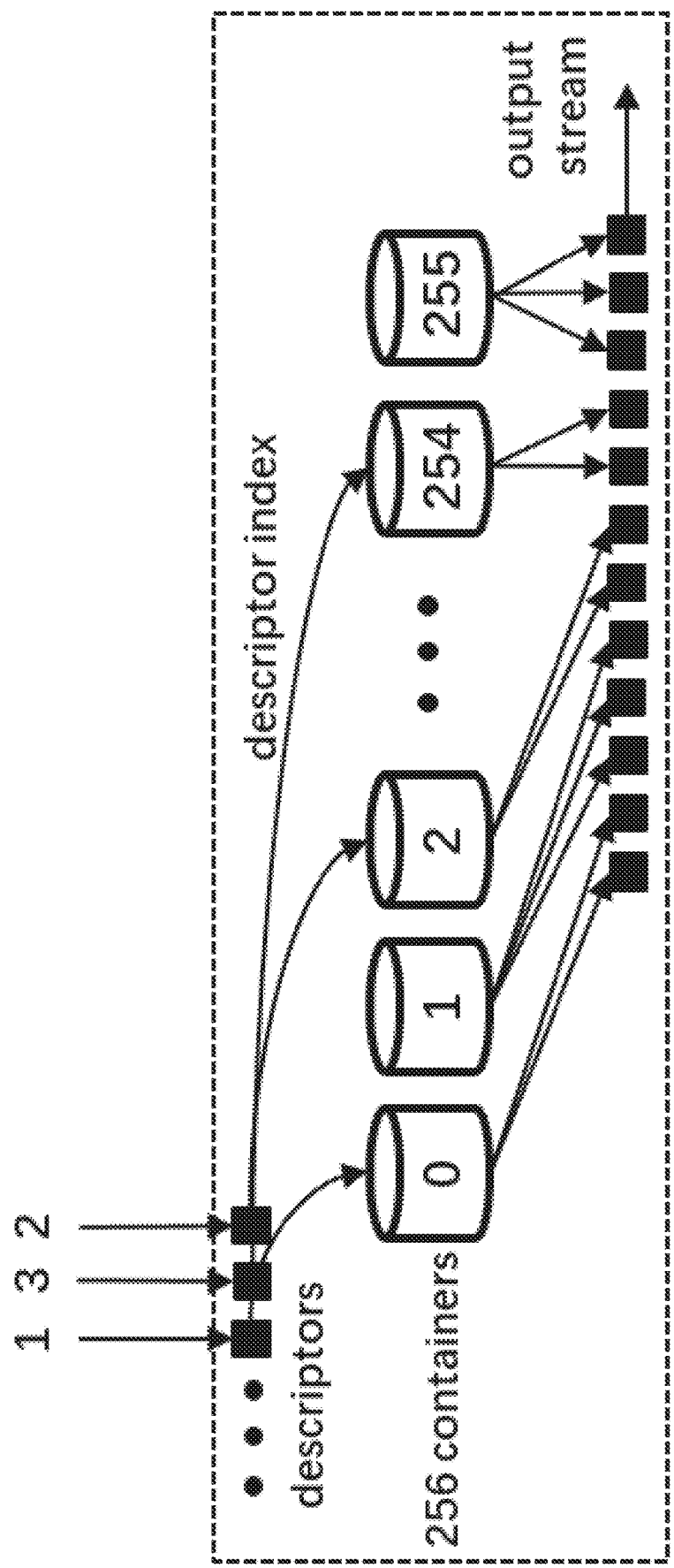
FIG. 3 illustrates a hardware architecture of a sorting module.

A last step is sorting (sort), and this design uses hardware implemented count sorting, as shown in FIG. 3. 256 containers are internally used for hardware sorting to cache an index of the feature point, and indexes corresponding to feature points with a same response value are cached in a same container. The sorting module is integrated with the rBRIEF computation module. After a descriptor is computed, an index of the descriptor is immediately stored in a container. After all descriptors are computed, indexes of the descriptors are sequentially outputted in order. Because only the index of the feature point is cached, only one BRAM and a few hundred LUTs need to be additionally occupied.

Figure 5:
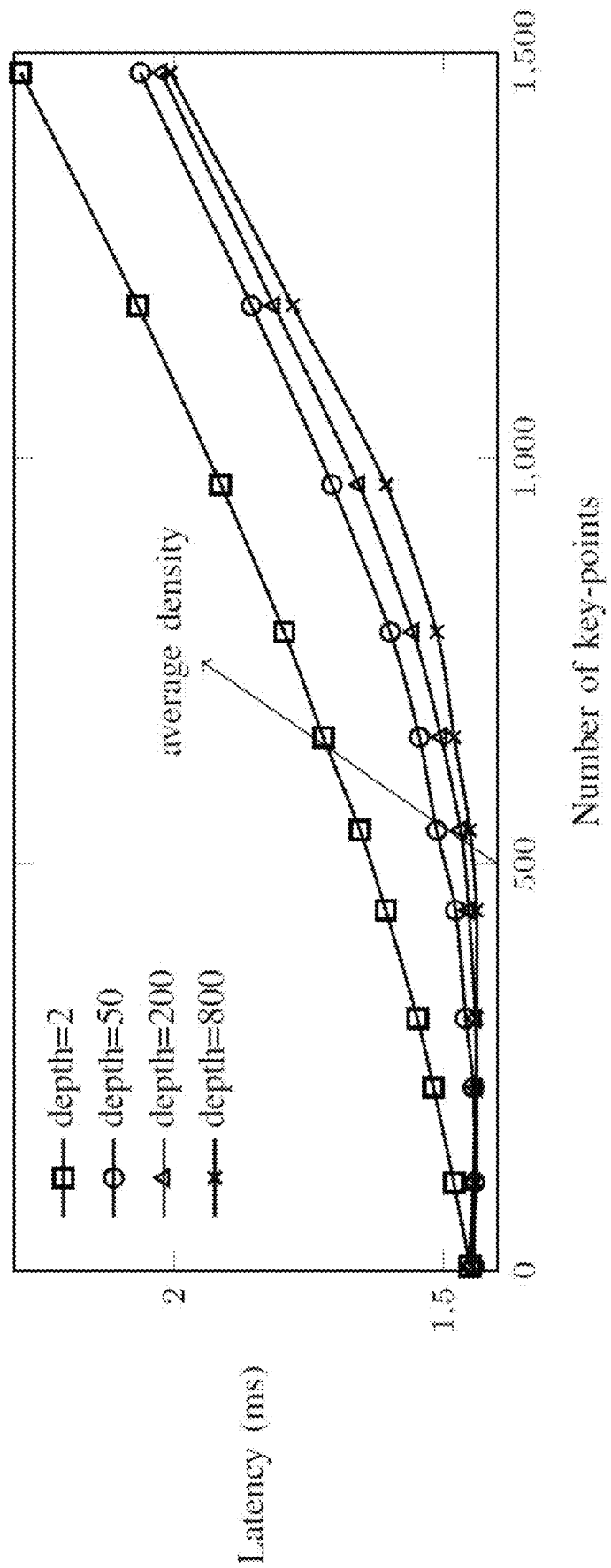
FIG. 5 illustrates verification of non-blocking computation.

FIG. 4 compares the present disclosure with the original ORB_SLAM3 and existing accelerator designs (eSLAM, ac2SLAM, and FSLAM). Experimental data shows that the present disclosure has a lowest latency and resource consumption, a highest accuracy, a lowest energy consumption. FIG. 5 shows a curve that a latency of the accelerator varies with a density of the feature point, which demonstrates that the present disclosure achieves non-blocking computation of the rBRIEF descriptor under an actual operating condition.

The invention claimed is:

1. A stream processing-based non-blocking oriented FAST and rotated BRIEF (ORB) feature extraction accelerator implemented by a field programmable gate array (FPGA), comprising:
   a downsampling module configured to adjust an input image to a required size to obtain an original image;
   a Gaussian filtering module configured to blur the original image to obtain a blurred image;
   a corner detection module configured to determine a position of a feature point in the blurred image and output a mask of the feature point;
   a non-maximum suppression (NMS) module configured to perform NMS on the mask of the feature point, wherein the stream processing-based non-blocking ORB feature extraction accelerator further comprises:
   a rotated binary robust independent elementary feature (rBRIEF) computation module configured to perform window column selection, rBRIEF computation, and window column First-In First-Out (FIFO) in parallel by using a cache management algorithm, wherein
   a working region of a computation module of an rBRIEF descriptor is a 37×37 sliding window, and the 37×37 sliding window is updated in each clock cycle; whenever the 37×37 sliding window is updated, an intermediate pixel of a leftmost column of pixels, namely left pixel, and an intermediate pixel of a rightmost column of pixels, namely right pixel, in the mask of the feature point are detected; when the right pixel is a feature point, an intermediate column of the blurred image is considered as a first column of a window, the intermediate column of the blurred image is written into a window column FIFO queue, a counter is reset, and next 36 intermediate columns are further written into the window column FIFO queue; and when the left pixel is a feature point, the intermediate column of the blurred image is considered as a last column of a window, a label is attached when each intermediate column is written into the window column FIFO queue, to indicate whether the intermediate column is a start column or an end column, and the rBRIEF computation module determines whether to perform the rBRIEF computation based on the label; and
   the rBRIEF computation module reads data from the window column FIFO queue and concatenates the read data into another window matrix; a new column is inserted at an end of the window matrix in each clock cycle, and other columns of the window matrix are sequentially shifted leftwards; window concatenation operates at a throughput of one column per cycle until a predetermined column is an end column; the reading of the window column FIFO queue is stopped, and the rBRIEF computation is performed; and when the rBRIEF computation is performed, the original image is configured to compute a direction of a centroid, and a BRIEF coordinate is rotated based on an angle of the direction to compute the rBRIEF descriptor; and
   a sorting module configured to perform hardware implemented count sorting.

2. The stream processing-based non-blocking ORB feature extraction accelerator implemented by the FPGA according to claim 1, wherein the sorting module uses 256 containers internally to cache an index of the feature point, and indexes corresponding to feature points with a same response value are cached in a same container.

3. The stream processing-based non-blocking ORB feature extraction accelerator implemented by the FPGA according to claim 1, wherein the sorting module is integrated with the rBRIEF computation module; after the rBRIEF descriptor is computed, an index of the rBRIEF descriptor is immediately stored in a container; and after all rBRIEF descriptors are computed, indexes of the rBRIEF descriptors are sequentially outputted in order.

* * * * *